July 1, 1941. T. E. MAHONEY 2,247,446
GRAIN CLEANER
Filed Jan. 16, 1939 2 Sheets-Sheet 1

INVENTOR.
THOMAS E. MAHONEY.
BY
ATTORNEYS

July 1, 1941.  T. E. MAHONEY  2,247,446
GRAIN CLEANER
Filed Jan. 16, 1939  2 Sheets-Sheet 2
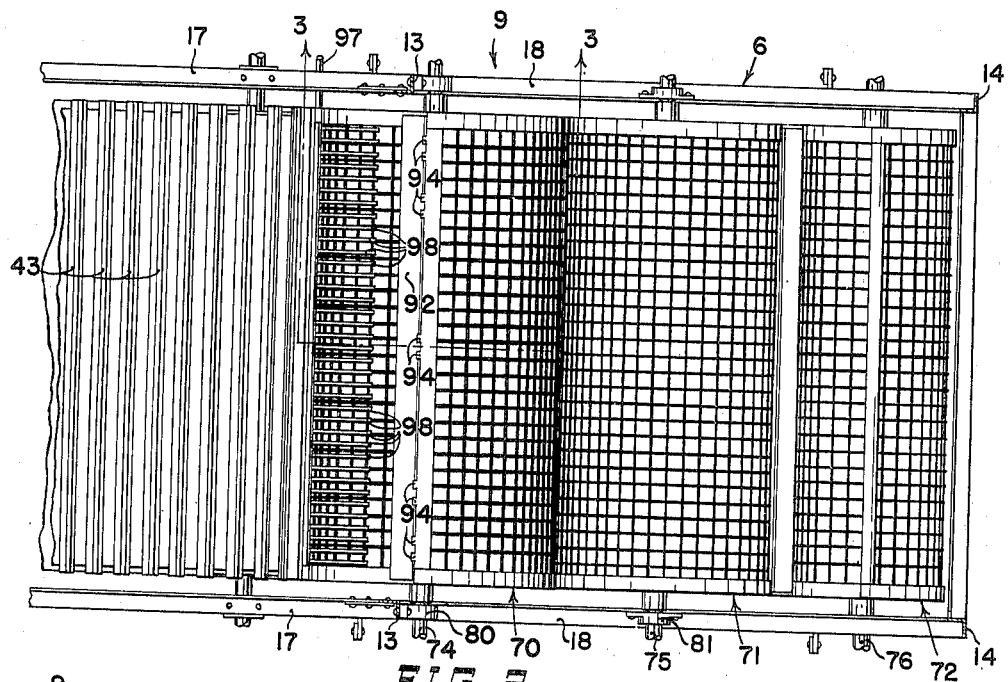
FIG.2
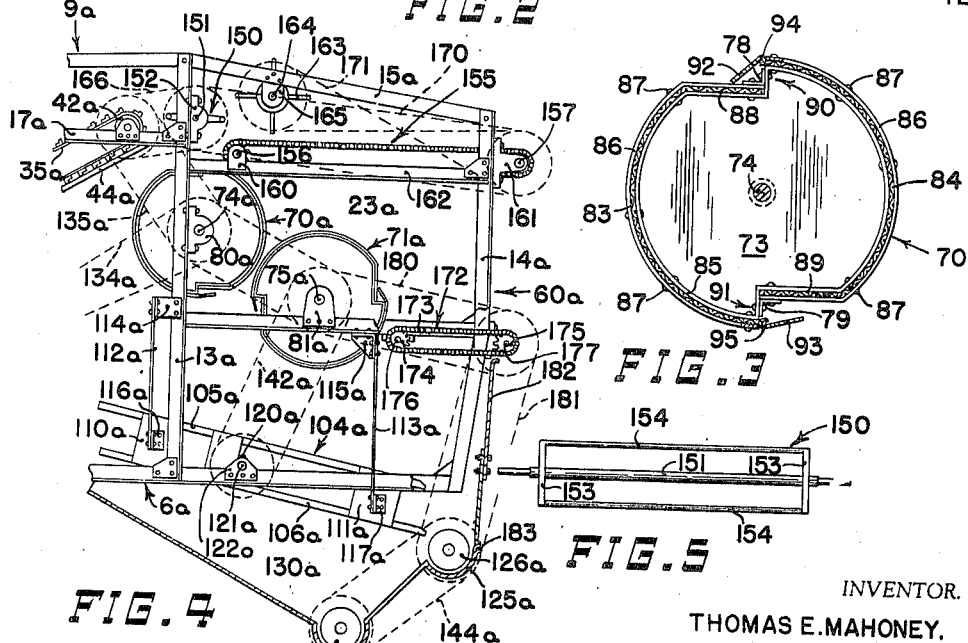
FIG.3
FIG.4
FIG.5
INVENTOR.
THOMAS E. MAHONEY.
BY
ATTORNEYS Patented July 1, 1941

2,247,446

UNITED STATES PATENT OFFICE 2,247,446

GRAIN CLEANER

Thomas E. Mahoney, Dorrance, Kans.

Application January 16, 1939, Serial No. 251,105

14 Claims. (Cl. 130—23)

The present invention relates generally to grain cleaning machinery for separating the grain from the straw, chaff and dust, and is more particularly concerned with separating and cleaning mechanism adapted for use in threshers, combines, and the like.

The principal object of the present invention is to provide a new and improved grain cleaning device that is efficient, compact, and relatively vibrationless. In the accomplishment of this object I use rotary screening cylinders of novel design to do the work of cleaning and separating heretofore done by reciprocating straw walkers and riddles thereby eliminating the highly objectionable but heretofore unavoidable vibration that is inherent in all reciprocating machinery.

Another object is to provide grain cleaning mechanism in which the mixture of grain, straw, chaff and dust is dropped upon one side of a rotary cleaning screen and a blast of air is directed through the screen from the other side thereof so that the air blast is driven through the falling grain unimpeded by the straw which is retained on the outside of the cylinder.

Still another object of the present invention is to provide a self-emptying rotary screening cylinder that allows any straw or other material that has found its way into the interior of the cylinder and that is unable to pass through the bottom mesh of the cylinder, to escape, thereby preventing accumulation of such material to the point where operation is impaired.

A further object is to provide a reciprocating recleaning screen in conjunction with the rotary screens. In view of the increased efficiency of the rotary screens over conventional straw walkers, the frequency of reciprocation can be decreased to a value at which vibration is negligible.

Another object is to provide novel means for suspending a shaker screen and for vibrating the same to secure a reciprocating or oscillating motion.

These and other objects and advantages of the present invention will become apparent after a consideration of the following detailed description of the preferred embodiments thereof, reference being had to the appended drawings, in which Figure 1 represents a sectional side view of a combine having grain cleaning and separating mechanism embodying the principles of my invention;

Figure 2 is an enlarged sectional plan view taken along the line 2—2 in Figure 1;

Figure 3 is a section of one of the rotary screens as viewed along the line 3—3 in Figure 2;

Figure 4 is a fragmentary sectional view of another embodiment of my invention; and Figure 5 is a top view of the reel used to pick up the long straw from the upper end of the conveyor and carry it over to the raddle chain conveyor to be discharged from the separator house.

Figure 1:
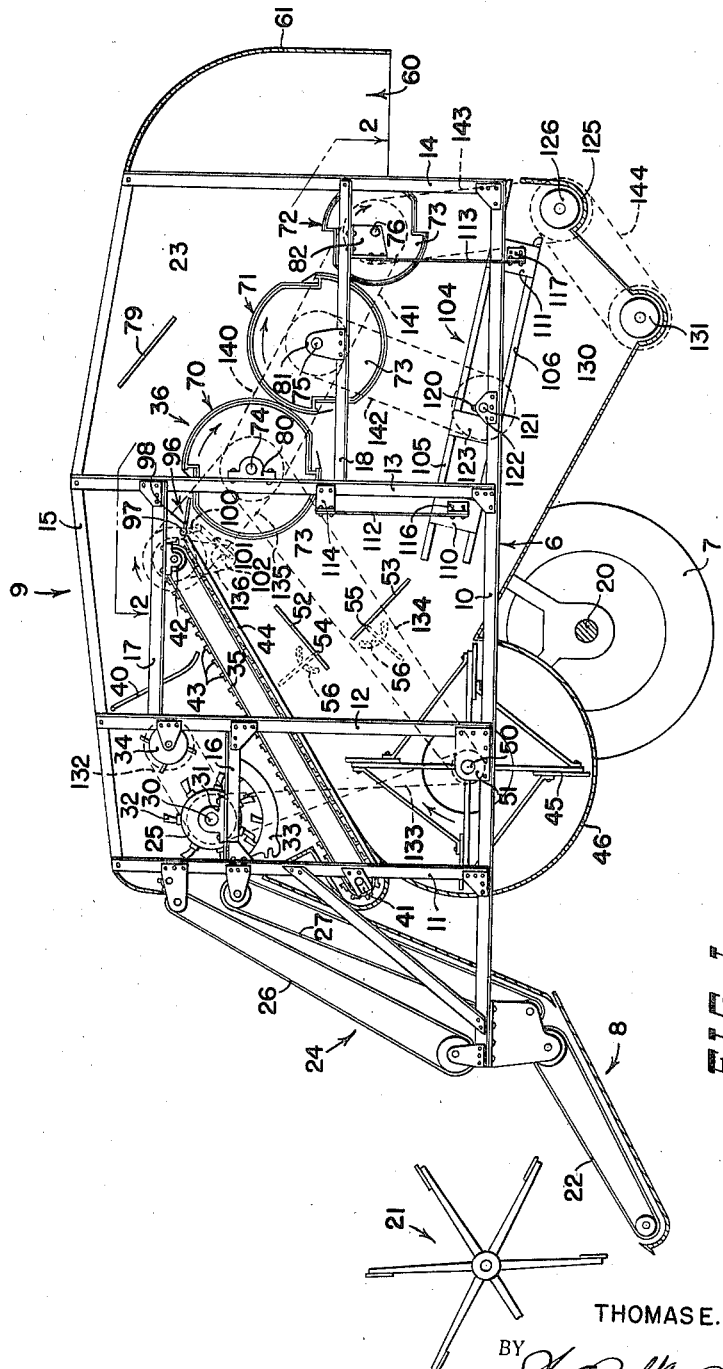

Referring now to the drawings and more particularly to Figures 1-3, it will be seen that the combine chosen to illustrate the principles of the present invention comprises a main implement frame 6 which is supported on ground wheels 7 and which carries a harvester unit 8 including cutting and elevating mechanism, and a threshing unit 9.

The main frame of the combine includes fore and aft extending lower frame bars 10 to which the lower ends of a series of vertical members 11 to 14 are attached. The upper ends of the vertical members are secured to frame bars 15, and other bars 16, 17, 18, cross braces, and the like, as may be necessary, complete the frame. The supporting wheels 7 are disposed substantially directly under the main frame of the combine, and are journaled on a transverse axle 20 which is carried in suitable supporting brackets fixed to the main frame.

The harvester unit 8 is disposed directly in front of the thresher unit 9 and comprises a suitable cutter bar (not shown), a reel 21, and pick-up conveyors 22, 24 together with suitable driving mechanisms therefor.

The threshing unit 9 consists of a housing 23 suitably mounted on the implement frame and extending transversely over the full width of the harvester unit 8. A feeder conveyor 24 extends upwardly and rearwardly from the rear end of the pick-up conveyor 22 to a point adjacent a threshing cylinder 25. The conveyor 24 preferably comprises upper and lower endless belts 26 and 27 trained over rollers and driven in such manner that the two adjacent inner runs travel upwardly together, compressing the harvested grain between them and conveying it up to the threshing cylinder 25.

The threshing cylinder 25 is carried on a threshing cylinder shaft 30 journaled for rotation in suitable bearings 31 mounted on the frame. The grain that has been elevated by the conveyor 24 is caught by the teeth 32 of the threshing cylinder 25 and drawn between the teeth of the concaves 33, which comb the kernels of grain from the stalks in the usual manner. Disposed generally above and rearwardly of the threshing cylinder 25 is a separating or stripper cylinder 34 that rotates in the same direction of rotation as the threshing cylinder and is provided with teeth that strip off any straw or other material that may tend to cling to the threshing cylinder teeth.

The threshed grain drops from the threshing cylinder 25 and separating cylinder 34 onto an endless canvas conveyor 35 trained over lower and upper rollers 41 and 42 and preferably having cross slats 43, and is carried upwardly and rearwardly thereby to the cleaning and separating mechanism, indicated in its entirety by the reference numeral 36. Below the conveyor 35 is an apron 44 that extends across the width of the feeder house and is fixed to the side walls thereof in any suitable manner. A shield 40 extends across the feeder house 23 above the conveyor 35 and deflects downwardly onto the conveyor any kernels of grain thrown rearwardly by the threshing cylinder 25 or separating cylinder 34.

At the upper end of the conveyor 35, the threshed grain is emptied into the grain cleaning mechanism 36 comprising, in the embodiment shown in Figures 1 and 2, three rotary cylindrical cleaning screens 70, 71 and 72 disposed with their axes arranged transversely in parallel relation and lying in a downwardly and rearwardly inclined plane. By this arrangement the second rotary screen 71 underlaps the first screen 70, and the third screen 72 underlaps the second screen 71. The cylindrical cleaning screens are mounted on cylinder heads or end plates 73 that are fixed to shafts 74, 75, and 76. These shafts are journaled in suitable bearings held by bracket members 80, 81, and 82 that are bolted or otherwise secured to the implement frame, and are rotated slowly in the same direction (clockwise as viewed in Figure 1) by driving means to be described more in detail presently. As shown in Figure 3, each cleaning cylinder is made up of two cylinder halves 83 and 84 of open mesh wire screen that are mounted at their ends on flanges 85 provided on the cylinder heads 73. Straps 86 embrace the ends of the screen sections and are secured to the flanges 85 by rivets or bolts 87, and angle brackets 78 and 79.

For the purpose of preventing straw or trash that might get into the interior of the cylinder from accumulating and interfering with the free passage of grain through the cylinder, and to make the cylinders self-emptying, I have provided two apertures or openings 90 and 91 through the outer periphery of the cylinder along the lines of separation between the screen cylinder halves. These openings 90, 91 are preferably made by bending one edge of each of the screen sections inwardly to space the latter radially inwardly of the adjoining screen edge, as at 88, 89 (see Figure 3) so that as the cylinder rotates clockwise, any straw or other material that has failed to pass through the screen mesh at the bottom of the cylinder will slide out of the opening and thereby prevent clogging. To prevent the straw or other material from entering the openings 90, 91 when they are at the top of the cylinder, I have provided gates 92, 93 that are hinged to the trailing edges of the cylinder halves at 94, 95, and rest by gravity upon the bent portions 88, 89 when at the top of the cylinder, thereby closing the openings 90, 91. As the openings rotate around to the under side of the cylinder, however, the gates 92, 93 drop away from the inwardly bent portions 88, 89 and open the openings to allow the entrapped material to escape. The center of gravity of each of the gates 92, 93 is spaced inwardly from its respective pivot 94, 95 when the gate is in closed postiton so that the gate opens by gravity after the opening has passed below the axis of the cylinder, thereby allowing the gate to pass under the adjacent underlapping cylinder before opening. As the gate passes under the cylinder and begins its ascent, it is urged toward closed position by the pressure of the air blast discharged by a blower fan 45, which will be described in more detail presently.

The threshed material, comprising a mixture of straw, kernels of grain, chaff and dust, is tossed upon the upper cylinder 70 by means of an oscillating grate 96 comprising a transverse shaft 97 which is pivotally supported on the upper end of the apron 44 immediately rearward of the upper end of the conveyor 35 and has a plurality of rearwardly extending grate bars 98 fixed thereto. The grate 96 receives the material as it drops from the conveyor and tosses it up into the air a short distance so that it falls upon the top outer surface of the screen cylinder 70 through a blast of air generated by a blower fan 45. The oscillating grate 96 is provided with an arm 100 that is connected by means of a pitman 101 with a crank on a wheel 102 in such manner that rotation of the wheel 102 causes the grate 96 to oscillate through a short vertical arc.

The blower fan 45 is disposed in a fan housing portion 46 of the feeder house below the dividing wall 44 and is carried on a fan shaft 50 which is journaled in suitable bearings carried by brackets 51 bolted or otherwise secured to the frame bars 10. The housing 23 is provided with pivoted dampers or deflectors 52, 53 that are mounted on shafts 54, 55, and each of these shafts has an end turned to form a handle that cooperates with a locking sector 56 fixed to the wall of the housing, so that the discharge dampers may be maintained in adjusted position for determining the volume and direction of air delivered by the fan 45. The blast of air from the fan 45, controlled by the dampers 52 and 53, is directed against the under side of the rotary screen cleaners 70, 71, and 72 and is driven through the threshed grain as it falls through the air, separating the dust, chaff and the like from the grain as is well understood in the art. By directing the air toward the rotary screen from a point diametrically opposite from the side on which the straw is lying, the air tends to lift the straw from the screen thereby loosening it and facilitating separation of the grain therefrom. Then as the screen revolves, and the straw is carried around therewith, the force of the air tends to turn the mat of straw over as it drops from the first screen to the second, as will be described.

The dust, light chaff, and the like is discharged from the housing 23 through an opening 60 at the rear end thereof provided with a hood 61 constructed so that the material is discharged in a downward direction. A deflector 79 across the width of the feeder house 23 above the screen cylinders 70, 71 and 72 deflects downwardly any grain that might be picked up and carried by the air blast from the fan 45, thereby preventing grain from being blown out the discharge opening 60 with the dust and chaff. The clean grain thus falls through the mesh of the cylindrical screens, the light chaff and dust are carried by the air blast from the fan 45 and discharged through the opening 60, while the straw is carried around on the outside of the cylinder 70 and dropped onto the top of the second rotary cylindrical screen 71. In falling from the first cylinder 70 to the second cylinder 71, the straw is turned over and agitated by the air blast in such manner that any kernels of grain resting on or held by the mass of straw are freed and allowed to drop through the screen mesh of the second cylinder. By arranging the screens in rearwardly descending order, the vertical drop between screens is made sufficient to allow the air draft to engage the loosely falling material. The underlapping arrangement of the screens insures that none of the falling material drops between the screens.

The third rotary screening cylinder 72 gives the straw another turning over to free any kernels of grain that might have failed to drop through the first and second cylinders, and then discharges the straw upon the ground. I prefer to make the third cylinder 72 smaller in diameter than the first two for the double purpose of securing a greater vertical drop as the straw falls from the surface of cylinder 71 and also to reduce the overall length of the machine and reduce weight. Under certain conditions the third cylinder can be dispensed with and a conveyor or other straw discharging device substituted for it.

From the rotary cylindrical screens, the grain falls upon a recleaning shaker screen indicated in its entirety by the reference numeral 104 and comprising an upper screen frame 105 and a lower screen frame 106 spaced apart and connected by plates 110 and 111 at the front and rear ends thereof. The shaker screen 104 is connected with the implement frame 6 for fore and aft movement, by resilient means in the form of spring steel straps 112 and 113 that are fixedly connected to brackets 114 and 82 on the frame 6 and depend therefrom. The lower ends of the straps 112, 113 are connected to bracket pieces 116 and 117 fixed to the plates 110, 111, respectively. A shaking, or reciprocating motion is imparted to the recleaning screen 104 by means of a cam 120 fixed to a shaft 121 which is journaled in suitable bearings carried by a bracket member 122 fixed to the frame 6. As the shaft 121 rotates, the cam 120 acts against a cross piece 123 fixed to the frames 105, 106 and moves the recleaning screen 104 forwardly against the resistance or pressure of the spring straps 112, 113 which return the screen to its original position as soon as the cam 120 moves around out of contact with the cross piece 123.

The screen mesh fixed to the upper frame 105 is made coarse enough to allow grain and tailings to pass through, but fine enough to hold any straw that might have gotten through the rotary screen cylinders or been ejected through the openings 90, 91. The recleaning screen is tilted slightly downwardly at its rear end to cause retained material to work its way down to that end, and it will be observed that the rear end of the upper screen frame 105 extends rearwardly over the tailings trough 125. Thus, straw or like material that has passed through the rotary screen cylinders is stopped and ejected.

The screen mesh fixed to the lower frame 106 is made fine enough to pass only grain, and the retained tailings work their way down to the end and fall into the tailings trough 125 where they are removed by a tailings auger 126 and returned to the cylinder 25 by suitable conveying means to be re-threshed and sent through the cleaning mechanism again. The clean grain falls through the lower screen 106 into a hopper 130 having downwardly sloping sides and is removed by a grain auger 131 to the usual storage bin or discharge chute.

Power for driving the operating parts of the combine may be derived from any of the usual sources such as an auxiliary engine or from the power take-off shaft of the tractor. Inasmuch as the driving connections have no bearing on my invention other than the necessity for rotating the various shafts at a suitable speed and in the proper direction, I have shown such driving connections diagrammatically, in the form of belts or chains, driven from the threshing cylinder shaft 30. Thus, the separating cylinder 34 is driven from the threshing cylinder shaft 30 and in the same direction by a belt 132 trained over suitable pulleys on the threshing cylinder and separating cylinder shafts, while the fan 45 is driven in the opposite direction by a crossed belt 133. The first, or upper screening cylinder 70 is driven counterclockwise, or in the same direction as the fan 45, but at a greatly reduced speed in the order of 30 R. P. M., by means of a belt 134 trained over suitable pulleys fixed on the fan shaft 50 and cylinder shaft 74. The conveyor 35 may be driven from the cylinder shaft 74 by a belt 135, and the crank shaft for oscillating the grate 96 may be driven from the conveyor drive by means of a belt 136. The second screening cylinder 71 is driven in the same direction and at substantially the same speed as the first cylinder 70 by means of a belt 140 trained over suitable pulleys fixed to the shafts 74 and 75. Likewise, the third cylinder 72 is driven in the same direction and at substantially the same speed by a belt 141 trained over pulleys fixed to shafts 75 and 76. The cam shaft 121 for oscillating or shaking the recleaning screen 104 is driven from the second cylinder 71 by a belt 142 at a speed in the order of 30 R. P. M. The tailings auger may be driven from the third cylinder shaft 76 by a belt 143, and the grain auger driven from the tailings auger by a belt 144.

In Figures 4 and 5 is shown a modified form of the above described grain cleaning mechanism embodying the principles of my invention but using only two rotary cylindrical screen cleaners instead of three, and having a device for removing a portion of the longer straw before it reaches the screening cylinders, thereby increasing the capacity of the latter. Parts similar to those described in the foregoing description have been given the same number with the suffix "a" added.

Referring now to Figures 4 and 5, it will be seen that the oscillating grate 96 has been omitted, and in its place is a retarder reel 150 shown in more detail in Figure 5. The reel 150 comprises a transverse shaft 151 journaled at its ends in suitable bearings held by brackets 152 that are fixedly secured to the frame 6a. Fixed to the shaft 151 adjacent its ends are spoke pieces 153 having bars 154 fixedly secured to and extending between their ends. The reel 150 rotates in a clockwise direction, as viewed in Figure 4, and picks up the longer pieces of straw from the end of the conveyor 35a, carrying them over and onto a raddle chain conveyor 155 of conventional design and at the same time retards the material which is being discharged upon the first screen 70a. The conveyor 155 is made up of two endless chains trained over pairs of sprockets that are carried on shafts 156 and 157 journaled in suitable bearings held by brackets 160 and 161 mounted on the frame 6a. A plurality of cross bars (not shown) are fixed to and extend between the chains, being spaced apart somewhat to allow grain and tailings to fall through while conveying the straw rearwardly. The rear end of the conveyor 155 extends through an opening in the housing 23a and drops the straw onto the ground, the lower run of the conveyor operating immediately above and resting on a shelf 162 so that it drags the material that has fallen through the cross bars of the upper run back to the upper cylinder 70a and discharges it upon the top side thereof. A beater 163 carried on a shaft 164 above the raddle chain conveyor 155 beats down and agitates the straw carried by the conveyor, loosening up any particles of grain carried by the straw to facilitate its dropping through the cross bars onto the shelf 162. The shaft 164 of the beater 163 is journaled in bearings carried by bracket members 165 which are secured to the frame 6a in any suitable manner. The reel 150 is driven from the conveyor drive by means of a belt 169 and, in turn, drives the raddle chain conveyor 155 by a belt 170 trained over pulleys fixed to the reel shaft 151 and rear conveyor sprocket shaft 157. The beater 163 is driven at a fairly high speed and in a counter-clockwise direction by a crossed belt 171 trained over pulleys secured on the beater shaft 164 and conveyor drive shaft 157.

In this embodiment of my invention, the third rotary screen cylinder 72 has been replaced by a raddle chain conveyor 172 comprising endless chains 173 trained over sprockets 174 and 175 and having spaced cross bars extending between them so that the straw will be carried from the second cylinder 71a out through the opening 60a in the rear end of the feeder house 23a, while grain and tailings will fall through the conveyor bars onto the recleaning screen 104a and into the tailings trough 125a. The sprockets 174 and 175 are fixed on shafts 176 and 177, respectively, that are journaled in suitable bearings provided in brackets fixed to the frame 6a, and the conveyor is driven from the second cylinder 71a by a belt 180 trained over pulleys fixed to the cylinder shaft 75a and rear sprocket shaft 177. The tailings auger 126a and grain auger 131a are driven from the conveyor drive shaft 177 by a belt 181. Another modification is seen in the upper screen rack 105a which is not extended rearwardly over the ground, but, instead, discharges its material into the tailings trough 125a. A windboard 182 is hinged to the rear edge 183 of the tailings trough 125a and is adjustable by swinging outwardly to allow draft from the fan to pass out under the conveyor 172 or to direct it up through the latter.

From the foregoing it will be seen that my invention provides a compact and efficient grain cleaning mechanism in which vibration has largely been eliminated through the use of rotating members instead of the conventional reciprocating straw walkers. The vibration set up by the reciprocating recleaning screen 104a is almost imperceptible because of its light weight and relatively slow motion, so it may be disregarded as a source of vibration.

What I claim as my invention is:

1. Screening mechanism comprising a substantially cylindrical rotary screen disposed with its major axis approximately horizontal, means for rotating said screen about said axis, an oscillating grate for tossing the grain upon the top outer surface of said screen, a source of air draft, means for directing said air draft against said screen substantially diametrically opposite the material upon the screen in such a manner that the air passes through the screen against the material thereon, tending to lift the latter away from the screen and thereby loosening it and facilitating separation thereof.

2. Screening mechanism comprising a first substantially cylindrical rotary screen disposed for rotation about an approximately horizontal axis, means for feeding material to be screened upon the outer surface of said screen near the upper side thereof, a second substantially cylindrical rotary screen disposed adjacent said first screen and having its top surface below the top surface of the first screen, said screens revolving at a slow speed whereby material deposited on top of the first screen is carried thereon and drops by gravity onto the second screen, means for directing the air through said screens toward the under side of the material thereon substantially at the portion of the first screen from which the material drops to the second screen, thereby tending to lift the material on said first screen and turn it over as it drops onto said second screen.

3. A grain cleaning device comprising a rotary cylindrical screen disposed with its axis substantially horizontal, means for rotating said screen, an oscillating grate disposed generally above said screen and adapted to toss grain upon the top outer surface of said screen, and a blower fan adapted to direct a blast of air through the falling grain as it drops upon said screen so that the dust and chaff are blown free of the falling grain, the cleaned grain dropping through said cylindrical screen and the straw being carried over on the outer surface of the rotating screen, and means for receiving the straw from said screen and discharging the same.

4. A grain cleaning device comprising, in combination, a rotary cylindrical screen disposed with its axis substantially horizontal, means for discharging grain upon the top outer periphery of said screen, and a second rotary cylindrical screen disposed with its axis below and substantially parallel to the axis of said first named screen, and the rotation of said screens being such that material remaining on the outer periphery of said first named screen is dropped upon the outer periphery of said second screen.

5. A grain cleaning device comprising, in combination, at least two adjacent rotary cylindrical screens disposed with their axes parallel and arranged so that a line tangent to the top outer periphery of both screens inclines downwardly in the direction of travel of material thereon, means for distributing grain upon the top outer surface of one of said screens, and means for rotating said cylinders in the same direction whereby material remaining on the outer surface of the one screen is carried over and dropped upon the outer surface of the other screen.

6. In a separator, a hollow rotary screen provided with a discharge aperture therein, said aperture being adapted to discharge overs which have found their way into the interior of the screen, means for feeding material upon the upper portion of said screen during rotation thereof, a closure for said aperture, and pivot means connecting said closure to said screen for swinging movement between open and closed positions, said closure being held by gravity in closed position when the aperture is on the top side of the screen and in open position when said aperture is on the bottom side of the screen, said pivot means being spaced radially outwardly from the center of gravity of the closure when the closure is in closed position, whereby the closure opens by gravity after the aperture has passed below the axis of the screen.

7. In a separator, a cylindrical screen mounted for rotation about the major axis thereof and having a pair of adjoining edges disposed parallel to said axis and spaced apart in a radial direction to form a radially and longitudinally extending opening in the screen, and a closure for said opening comprising a flap pivotally connected along one edge of said opening for free swinging movement about an axis parallel to the axis of rotation of the screen, said pivotal connection being so disposed that the flap is held by gravity in a position extending inwardly toward the axis of the cylinder to close said opening during a portion of each revolution in which said opening is in the upper side of the screen, and in open position during a portion of each revolution in which said opening is in the lower side of the screen.

8. Screening mechanism comprising, in combination, a first rotary screen disposed for rotation about a generally horizontal axis, means for discharging material upon the top outer periphery of said screen, a second rotary screen disposed adjacent said first screen in underlapping relation thereto, so that material carried over on the outer periphery of said first screen is dropped upon the top outer periphery of said second screen, a source of air draft, and means for directing the air draft substantially diametrically across the first screen toward the material at the point at which it tends to drop therefrom, thereby tending to lift the material away from said first screen and to turn it over as it drops to said second screen.

9. Screening mechanism comprising, in combination, a first rotary screen disposed for rotation about a generally horizontal axis, means for discharging material upon the top outer periphery of said screen, a second rotary screen disposed adjacent said first screen for rotation in the same direction of rotation as said first screen about an axis parallel to and at a lower elevation than the axis of said first screen, so that material carried over on the outer periphery of said first screen is dropped upon the top outer periphery of said second screen.

10. Screening mechanism comprising, in combination, a first rotary screen disposed for rotation about a generally horizontal axis, means for discharging material upon the top outer periphery of said screen, a second rotary screen disposed adjacent said first screen in underlapping relation thereto, so that material carried over on the outer periphery of said first screen is dropped upon the top outer periphery of said second screen, and rotatable endless conveying means underlapping said second screen for receiving material therefrom.

11. Screening mechanism comprising, in combination, a first rotary screen disposed for rotation about a generally horizontal axis, means for discharging material upon the top outer periphery of said screen, a second rotary screen disposed adjacent said first screen in underlapping relation thereto, so that material carried over on the outer periphery of said first screen is dropped upon the top outer periphery of said second screen, and a raddle conveyor disposed adjacent said second screen for receiving material dropped therefrom and for conveying the latter away from said screening mechanism.

12. Screening mechanism comprising, in combination, a rotary screen disposed for rotation about a generally horizontal axis, means for rotating said screen, means for discharging material upon the top outer periphery of said screen, a retarder reel rotatably disposed between said screen and said discharging means and on top of which said last named means discharges said material, means for driving said reel in the same direction of rotation as said screen for retarding said material as it is dropped upon said screen, and for separating the coarser material therefrom, and means for receiving said coarser material from said reel and conveying said coarser material from said screening mechanism.

13. A rotary screening cylinder having a pair of adjoining edges disposed parallel to the axis of rotation of the cylinder, one of said edges being spaced radially inwardly from the other edge to provide a longitudinally extending depressed shelf, said edges forming a radially and longitudinally extending discharge opening in the cylinder, a gate hinged to the outer edge of said discharge opening for swinging movement between open and closed positions, said gate being held by gravity in closed position with its free edge resting on said depressed shelf when at the top of the cylinder, and said gate swinging by gravity away from said depressed shelf to open position when at the bottom of the cylinder.

14. Screening mechanism comprising a rotary screening cylinder having a pair of adjoining edges disposed parallel to the axis of rotation of the cylinder, one of said edges being spaced radially inwardly from the other edge to provide a longitudinally extending depressed shelf, said edges forming a radially and longitudinally extending discharge opening in the cylinder, a gate hinged to the outer edge of said discharge opening for swinging movement between open and closed positions, said gate being held by gravity in closed position with its free edge resting on said depressed shelf when at the top of the cylinder, and said gate swinging by gravity away from said depressed shelf to open position when at the bottom of the cylinder, a source of air draft, and means for directing the air draft against the under side of the cylinder whereby the gate is urged toward closed position by the pressure of the air draft.

THOMAS E. MAHONEY.